United States Patent [19]

Gaiser

[11] Patent Number: 4,745,751
[45] Date of Patent: May 24, 1988

[54] MASTER CYLINDER WITH FAST FILL VALVING MECHANISM

[75] Inventor: Robert F. Gaiser, Stevensville, Mich.
[73] Assignee: Allied Corporation, Morristown, N.J.
[21] Appl. No.: 10,361
[22] Filed: Feb. 3, 1987
[51] Int. Cl.$^4$ ............................................. B60T 11/08
[52] U.S. Cl. ............................................. 60/578; 60/589
[58] Field of Search ......................... 60/589, 588, 578; 417/307

[56] References Cited

U.S. PATENT DOCUMENTS

| | | | |
|---|---|---|---|
| 4,099,380 | 7/1978 | Cadeddu | 60/589 |
| 4,199,949 | 4/1980 | Cadeddu | 60/589 |
| 4,514,985 | 5/1985 | Cadeddu | 60/589 |
| 4,559,781 | 12/1985 | Steer | 60/589 |
| 4,685,300 | 8/1987 | Steer | 60/589 |

Primary Examiner—Abraham Hershkovitz
Attorney, Agent, or Firm—Larry J. Palguta; Ken C. Decker

[57] ABSTRACT

The master cylinder (10) comprises a housing (12) having a longitudinal bore (14), a housing end (16) enclosed by a bearing member (18) which retains a sleeve member (20) within the bore (14), a reservoir (70) mounted on the housing (12) and a pair of pistons (30, 40) received slidably within the bore (14), one piston (30) extending through an end (24) of the sleeve member (20). The one piston has an end (32) which provides seating for a fast fill valving mechanism (110). The fast fill valving mechanism (110) comprises a piston support guide (120) supporting a fast fill seal (150) and seal retainer (160) between the support guide (120) and the surface (23) of the sleeve member (20). The seal retainer (160) engages one end (142) of a spring (140), the other spring end (143) located at the end (32) of the piston. Displacement of the one piston (30) within the bore (14) creates an increasing pressure which will, at a predetermined higher pressure, cause the spring (140) to collapse or bend and permit axial displacement of the seal (150) and seal retainer (160) away from sealing engagement with a portion (123) of the piston support guide (120), and thereby permit fast fill fluid pressure within the primary chamber (88) to communicate with an auxiliary chamber (180).

19 Claims, 2 Drawing Sheets

MASTER CYLINDER WITH FAST FILL VALVING MECHANISM

The present invention relates to a fast fill valving mechanism for a master cylinder, particularly a master cylinder which has a short length and compact structure.

Master cylinders usually require an initial period of actuation that produces a hydraulic pressure and fluid displacement which places the wheel brakes in position for the initiation of braking. In other words, a certain amount of hydraulic fluid must be displaced by the master cylinder through the system in order to merely place the pistons and associated brake equipment in position for the initiation of braking. It is highly desirable to provide a master cylinder construction which when actuated effects a quick or "fast fill" of the associated brake lines and braking apparatuses so that the brakes are ready immediately for the commencement of braking. The result is a more quickly responsive braking system because the fast fill construction eliminates a longer brake pedal stroke necessary for effecting the displacement of fluid within the brake system. Prior master cylinder constructions providing for a "fast fill" of the braking system typically include a ball valve and other such devices. These structures are speed sensitive because a slow actuation of the brakes permit fluid leakage through the valving and thus fails to effectively accomplish the desired transmittal of brake fluid to the brake system, U.S. Pat. No. 4,559,781 and patent application Ser. No. 900,644 illustrate types of flexible sealing mechanisms for a master cylinder having a fast fill function. It is desirable to provide a fast fill mechanism for a short master cylinder which will provide solutions to the above problems and which will be easily assembled and cost less than prior fast fill master cylinder constructions.

The present invention comprises a master cylinder housing with a bore extending axially therein, a reservoir providing a fluid for said bore, and end of said housing having a bearing member attached thereto and retaining a sleeve member within said bore, a pair of pistons associated with said master cylinder housing and one of said pistons extending through an opening in said bearing member, an end of said one piston having a piston support guide, seal, seal retainer, and spring means disposed thereat between the end of the one piston and sleeve member, the seal mounted upon the seal retainer which engages said spring means, the seal engaging sealably the sleeve member and the piston support guide, movement of said one piston effecting increased pressure within an associated pressure chamber of said master cylinder and causing said seal retainer and seal to be displaced axially against said spring means so that the seal disengages the piston support guide and permits fluid pressure within said chamber to be communicated past said seal and seal retainer.

One way of carrying out the invention is described in detail below with reference to the drawings which illustrate an embodiment in which.

Figure 1:
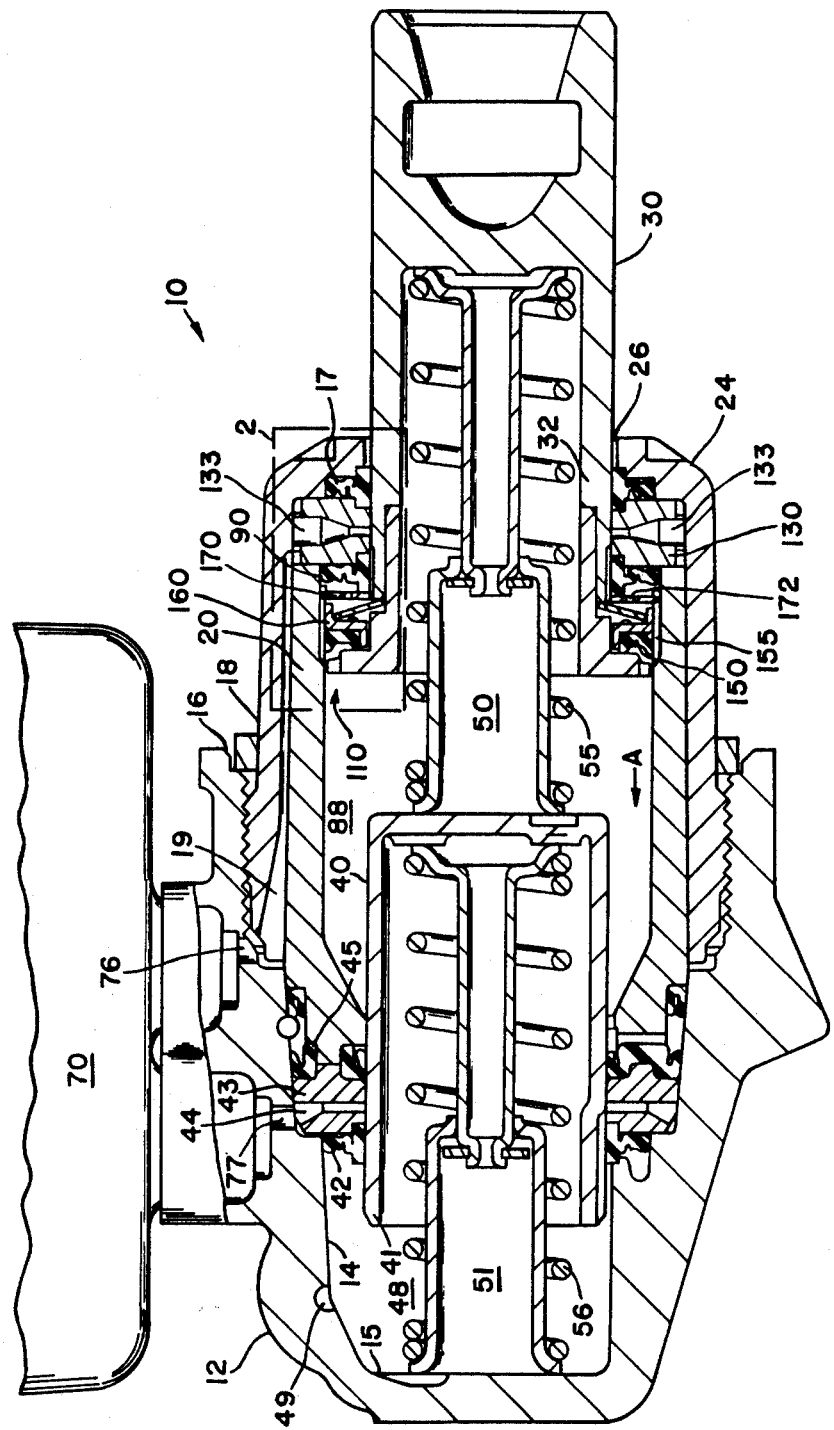
FIG. 1 is a section view of the master cylinder of the present invention.

The master cylinder of the present invention is designated generally by the reference numeral 10 in FIG. 1. Master cylinder 10 includes a housing 12 having therein a longitudinal bore 14 with an open end 16. Open end 16 threadably receives a bearing member 18 which positions a sleeve member 20 within the bore 14. Bearing member 18 extends radially inwardly at end 24 to provide an opening 26 through which extends a first or primary piston 30. First piston 30 is spaced apart from second piston 40 by a top hat construction 50 which includes spring 55. Second piston 40 is spaced apart from bore end 15 by a top hat construction 51 which includes spring 56. A reservoir 70 is disposed atop and attached to the housing 12. The bearing member 18 includes a longitudinal groove or passageway 19 between the interior surface of the bearing member and sleeve member 20, as described previously in U.S. Pat. No. 4,474,005 incorporated herein by reference. Hydraulic fluid contained within reservoir 70 may communicate through a reservoir opening (not shown), housing opening 76, and passageway 19. A forward reservoir opening (not shown) provides for hydraulic fluid communication to chamber 48 via a housing opening 77. Second piston 40 includes at an end 41 an flexible seal 42 which engages the interior surface of bore 14, a retainer 43 which includes a radial opening 44 communicating with housing opening 77, and a seal member 45 engaging the interior of bore 14. Bore 14, second piston 40, seal 42, retainer 43, and seal 45 define a second pressure chamber 48 which communicates with an outlet 49.

Bearing member 18 is threadably engaged with housing end 16 and includes a seal 17. The primary piston 30 includes an end 32 which receives a land 130 located between the bearing end 24 and piston 30, the land 130 having a radial opening 133 which communicates with passageway 19. Land 130 abuts and positions a flexible replenishing seal 90 which is maintained axially in place by a piston stop washer 170. Seal 90 is disclosed in copending patent application Ser. No. 835,833, now U.S. Pat. No. 4,685,300 incorporated herein by reference. Piston stop washer 170 is seated in sleeve member 20 at compensation grooves 155 and includes a plurality of openings 172. Thus, piston stop washer 170 assists land 130 in positioning axially flexible replenishment seal 90 at end 24 of bearing member 18.

Figure 2:
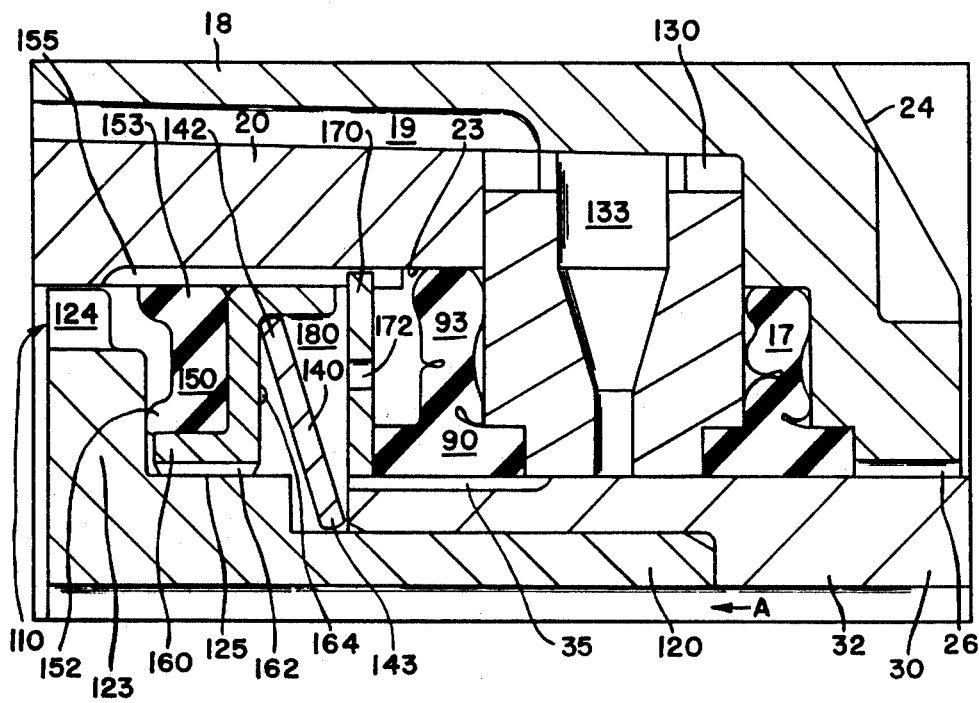
FIG. 2 is an enlarged view of a portion of FIG. 1.

Referring to FIG. 2, disposed on piston end 32 is a fast fill valving mechanism indicated generally by reference numeral 110. Fast fill valving mechanism 110 comprises a piston support guide 120 which is annular and is received within end 32 of piston 30. Piston support guide 120 extends axially and radially outwardly to guide portion 123 which includes a plurality of axial openings 124. A seal retainer 160 is generally Z-shaped and positioned on shoulder 125 of guide 120, the retainer 160 receiving a fast fill seal 150. Seal 150 includes lip 152 which engages sealingly the guide portion 123. Seal retainer 160 includes a plurality of axial grooves 162 and a plurality of abutments 164. Between seal retainer 160 and support guide 120 is spring 140 which may comprise an overcenter spring which is a Belleville washer type of spring. Spring 150 includes a radially outer end 142 which engages seal retainer 160 and a radially inner end 143 which is positioned at piston end 32 and guide 120. Piston end 32 includes a plurality of replenishment grooves 35 which permit fluid communication with the openings 133. The replenishment seal 90, piston end 32, piston support guide 120, seal 150, and sleeve member 20 define an auxiliary chamber 180.

Master cylinder 10 operates according to a sequence beginning with FIGS. 1 and 2 which illustrate the master cylinder in an at-rest or unactuated position. Fluid may flow from reservoir 70 and through groove 19, between the land 130/sleeve member 20 interface and past replenishment seal 90 and washer 170 to compensation grooves 155; and through radial openings 133, replenishment grooves 35, to auxiliary chamber 180, to compensation grooves 155, through axial openings 124 and to primary chamber 88. Thus, there is fluid communication between reservoir 70 and primary chamber 88, and fluid communication between reservoir 70 and secondary chamber 48 via seal 42. When a push rod (not shown) coupled with the primary piston 30 is actuated in order to commence a braking cycle, piston 30 moves inwardly of bore 14. The piston end 32 moves axially in the direction of arrow A to displace guide 120, seal 150, seal retainer 160, and spring 140. The effective piston pressure area is the outside diameter of fast fill seal 150. Additional travel of piston 30 displaces a larger volume of hydraulic fluid than would be displaced normally by the outside diameter of piston 30. During the additional travel, the volume between fast fill seal 150 and replenishment seal 90 increases, i.e. the volume of chamber 180 increases. Fluid is drawn into this chamber from the reservoir by means of passage 19 and the pumping capability or movement of flexible arm 93 of replenishment seal 90. Thus, fluid flows into the auxiliary chamber 180 which is increasing in size. Fluid cannot return to reservoir 70 because flexible arm 93 comprises a oneway valve which seals against the inside surface 23 of sleeve member 20. Therefore, during the actuation of the master cylinder, and regardless of the stroke rate of the pistons, there is no loss of fluid (in particular fast fill fluid volume) to the reservoir 70 as would occur with conventional master cylinders. Conventional master cylinders tend to be speed- or application-rate sensitive because the fast fill fluid volume may leak back toward the reservoir and thus defeat the purpose of the fast fill mechanism. The present invention is not speed- or application-rate sensitive. The pistons may be applied at a very slow rate and the fast fill valving mechanisms will work effectively.

Figure 3:
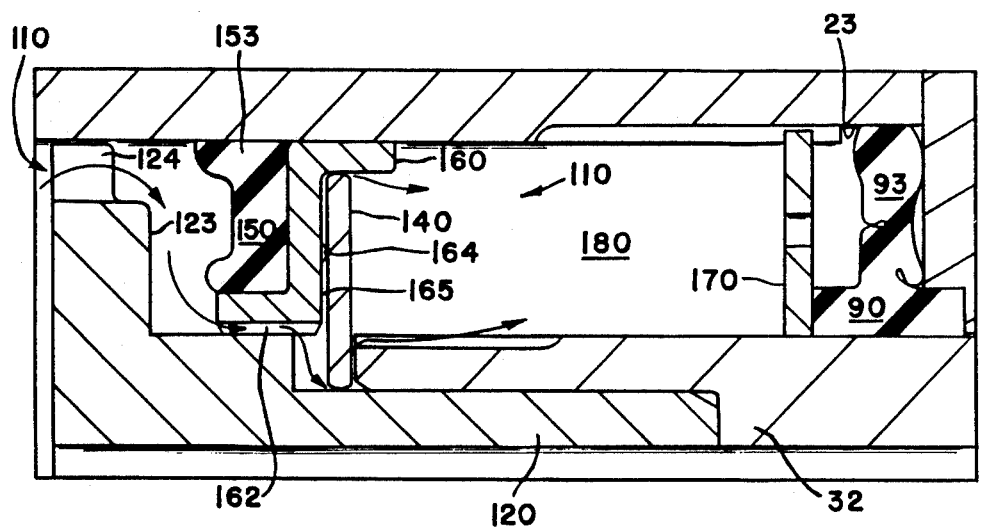
FIG. 3 is an enlarged view of a portion of FIG. 1 which illustrates the primary piston in an actuated position.

As the pressures increase within chambers 88 and 48 during actuation of pistons 30 and 40, fluid pressure in chamber 88 exerts a force against fast fill seal 150 and seal retainer 160 and which is directed away from the sealing engagement of seal lip 152 with guide portion 123. The attainment of a predetermined pressure causes spring 140 to collapse axially and permit seal retainer 160 and seal 150 to be displaced axially away from the surface of guide portion 123, as illustrated in FIG. 3. Thus, fast fill fluid pressure within chamber 88 is permitted to escape through axial openings 124, axial grooves 162, around spring 140 (note abutments 164 keep spring 140 displaced a distance from retainer surface 165 of retainer 160) to chamber 180. Once the fast fill function of the master cylinder has been accomplished, it is advantageous to vent a portion of the fast fill fluid pressure because at a higher braking pressure it is desirable to keep the forces reacted to the braking pedal at a lower level. Initially, the pressure within chamber 180 will be less than the pressure within chamber 88 by an amount approximating the value of the fast fill relief pressure. Approximately 100 psi is the normal pressure utilized by current conventional fast fill master cylinders. This 100 psi is the pressure that will push or collapse the spring 140 so that the seal retainer 160 and seal 150 may terminate the sealing engagement between seal lip 152 and guide surface 123. As pressure increases within auxiliary chamber 180, the replenishment seal 90 closes to prevent fluid pressure from escaping to reservoir 70, and pressures equalize and input force is reduced. The spring force of spring 140 acting against the pressure within chamber 88 approaches 0 as seal 150 and the retainer 160 move to the right, thus holding open the fluid path between chamber 88 and auxiliary chamber 180, and equalizing forces effected during the fast fill function portion of actuation. With the use of an overcenter type spring 140, when the spring force reaches 0 load the piston input force is reduced to the normal chamber pressure times the piston area, i.e., no additional input force is required after the fast-fill pressure is reached. Unlike prior fast fill constructions, the additional effort required for effecting the fast fill function does not continue during operation of the master cylinder. The additional effort is eliminated and the input effort or force reverts to normal piston diameter actuation force required for non-fast fill operation. A master cylinder having a reduced input effort required for non-fast fill operation is disclosed in commonly owned co-pending Ser. No. 010359 entitled "Master Cylinder Fast Fill Valving Mechanism with Ramp" by John E. Steer. Upon release of piston 30, the spring 140 returns to its original position and axially displaces retainer 160 and seal 150 in the direction of arrow A. When seal 150 returns to alignment with compensation grooves 155, fluid within auxiliary chamber 180 flows through grooves 155, over outer lip 153 of seal 150, and through axial openings 124 to chamber 88.

Various modifications of the above-described embodiment of the invention will be apparent to those skilled in the art. It is to be understood that such modifications can be made without departing from the scope of the invention.

I claim:

1. A master cylinder, comprising a master cylinder housing with a bore extending axially therein, a reservoir providing fluid for said bore, an end of said housing having a bearing member attached thereto and retaining a sleeve member within said bore, a pair of pistons associated with said master cylinder housing and one of said pistons extending through an opening in said bearing member, an end of said one piston having a piston support guide, fast fill seal, seal retainer, and spring means disposed thereat between the end of the one piston and sleeve member and comprising an overcenter spring, the fast fill seal mounted upon the seal retainer which engages said spring means, the fast fill seal engaging sealably the sleeve member and the piston support guide, application movement of said one piston effecting increased pressure within an associated pressure chamber of said master cylinder and the increased pressure transmitted to a brake circuit, the increased pressure causing said seal retainer and fast fill seal to be displaced axially against biasing of said overcenter spring so that the fast fill seal disengages the piston support guide and permits fluid pressure within said chamber to be communicated past said fast fill seal and seal retainer.

2. The master cylinder in accordance with claim 1, wherein the axial displacement of the retainer against the overcenter spring may result in the overcenter spring moving through center and eliminating fast fill loading upon the one piston whereby actuation force imposed upon the one piston is reduced to a force determined by the diameter of the one piston.

3. The master cylinder in accordance with claim 1, wherein the seal retainer includes an axial groove which permits fluid flow therethrough.

4. The master cylinder in accordance with claim 3, wherein the seal retainer includes abutments for engaging the spring.

5. The master cylinder in accordance with claim 1, wherein the sleeve member includes compensation grooves.

6. The master cylinder in accordance with claim 1, further comprising a piston stop washer, replenishment seal, and land member engaging said sleeve member.

7. The master cylinder in accordance with claim 6, wherein the end of the piston includes a replenishment groove disposed adjacent said spring.

8. The master cylinder in accordance with claim 7, wherein the land member includes radial openings which permit fluid communication with said replenishment groove.

9. The master cylinder in accordance with claim 8, wherein the piston stop washer includes a plurality of axial openings for permitting fluid flow therethrough.

10. The master cylinder in accordance with claim 9, wherein the sleeve member, replenishment seal, end of the one piston, piston support guide, and fast fill seal define an auxiliary chamber having disposed therein the spring and piston stop washer.

11. The master cylinder in accordance with claim 1, wherein the piston support guide includes axial openings permitting fluid communication with said fast fill seal.

12. The master cylinder in accordance with claim 11, wherein the seal retainer is Z-shaped and slides on the piston support guide.

13. The master cylinder in accordance with claim 1, wherein the spring is biased between the end of the one piston and the seal retainer.

14. A master cylinder, comprising a master cylinder housing with a bore extending axially therein, a reservoir providing fluid for said bore, an end of said housing having a bearing member attached thereto and retaining a sleeve member within said bore, a pair of said pistons associated with said master cylinder housing and one of the pistons extending through an opening in said bearing member, and a fast fill mechanism, characterized in that the fast fill mechanism is at an end of said one piston and comprises a fast fill seal, seal retainer, and spring means disposed between the end of the one piston and sleeve member, the fast fill seal engaging sealably the sleeve member and end of the one piston, the spring means disposed between said seal retainer and end of said one piston and comprising overcenter spring means, application displacement of the one piston effecting increased pressure within the bore and the increased pressure transmitted to a brake circuit, the increased pressure causing the fast fill seal and seal retainer to be displaced axially against biasing of said spring means so that the fast fill seal disengages from said end at a predetermined pressure and permits pressure in the bore to be communicated past said fast fill seal and seal retainer.

15. The master cylinder in accordance with claim 14, wherein the seal retainer has axial grooves.

16. The master cylinder in accordance with claim 14, wherein the end comprises a piston support guide having therein a plurality of axial openings.

17. The master cylinder in accordance with claim 14, wherein the sleeve member includes a plurality of compensation grooves, the compensation grooves disposed adjacent said fast fill seal when the one piston is in a determined position.

18. The master cylinder in accordance with claim 14, wherein the seal retainer includes abutments for engaging the spring means.

19. The master cylinder in accordance with claim 14, wherein axial displacement of the seal retainer against the overcenter spring means may result in the overcenter spring means moving through center and eliminating fast fill loading upon the one piston whereby actuation force imposed upon the one piston is reduced to a force determined by the diameter of the one piston.

* * * * *